United States Patent
Mori et al.

(10) Patent No.: US 7,258,388 B2
(45) Date of Patent: Aug. 21, 2007

(54) CONVERTIBLE TOP ASSEMBLY FOR VEHICLE

(75) Inventors: Hiroaki Mori, Kaita-cho (JP); Hiroki Tanoue, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/354,889

(22) Filed: Feb. 16, 2006

(65) Prior Publication Data
US 2006/0192411 A1  Aug. 31, 2006

(30) Foreign Application Priority Data
Feb. 25, 2005  (JP) .............................. 2005-050534

(51) Int. Cl.
*B60J 7/00* (2006.01)
(52) U.S. Cl. .............................. 296/107.09; 296/107.16
(58) Field of Classification Search ........... 296/107.09, 296/116, 107.16
See application file for complete search history.

(56) References Cited

U.S. PATENT DOCUMENTS

| 3,608,956 | A | * | 9/1971 | Adamski | .................... | 296/117 |
|---|---|---|---|---|---|---|
| 6,139,087 | A | * | 10/2000 | Wolfmaier et al. | .... | 296/107.16 |
| 6,629,719 | B2 | * | 10/2003 | Sims | ...................... | 296/107.09 |
| 6,695,385 | B1 | * | 2/2004 | Lange | .................... | 296/107.09 |
| 6,695,386 | B1 | * | 2/2004 | Willard | ................. | 296/107.16 |
| 6,843,522 | B2 | * | 1/2005 | Lange | .................... | 296/107.09 |
| 6,863,334 | B2 | * | 3/2005 | Dangl et al. | ........... | 296/107.09 |
| 7,063,371 | B2 | * | 6/2006 | Willard | ................. | 296/107.17 |
| 7,156,445 | B2 | * | 1/2007 | Taira et al. | ............ | 296/107.04 |
| 2005/0127708 | A1 | * | 6/2005 | Richter et al. | ......... | 296/107.15 |

FOREIGN PATENT DOCUMENTS

JP  08-207595  8/1996

* cited by examiner

*Primary Examiner*—Kiran B. Patel
(74) *Attorney, Agent, or Firm*—Nixon Peabody LLP; Donald R. Studebaker (57) ABSTRACT

Disclosed is a convertible top assembly for a vehicle, which comprises a pair of reinforcing plate members 20 each attached to an inner surface of a lower region in a corresponding one of right and left lateral edges of a convertible top 3, and connection means X (plate spring 28) for connecting between a main link 6 and each of the reinforcing plate members 20, whereby the rigidity of the lower region in each of the right and left lateral edges of the convertible top 3 is increased to ensure a sufficient sealing between the convertible top 3 and a vehicle body 2 in a closed position of the convertible top 3 in a simplified structure.

2 Claims, 7 Drawing Sheets

CONVERTIBLE TOP ASSEMBLY FOR VEHICLE

BACKGROUND OF THE INVENTION

1. Field of the Invention

The present invention relates to a convertible top assembly for a vehicle, and more particularly to a vehicle convertible top assembly having a convertible top adapted to be moved between a closed position where the convertible top is closed to cover an upper portion of a passenger compartment and a retracted position where the convertible top is retracted in a storage space at a rear end of a vehicle body.

2. Description of the Background Art

Heretofore, it has been well known a vehicle convertible top assembly having a convertible top adapted to be moved between a closed position where the convertible top is closed to cover an upper portion of a passenger compartment and a retracted position where the convertible top is retracted in a storage space at a rear end of a vehicle body. For example, as shown in Japanese Patent Laid-Open Publication No. 08-207595 (Patent Publication 1), the convertible top assembly includes one type which has a pair of frame members disposed, respectively, along right and left lateral edges of a convertible top and swingably pivoted relative to a vehicle body in such a manner as to be swung in a rearward inclined direction when the convertible top is retracted and to be swung in a standing direction when the convertible top is closed.

In the convertible top assembly comprising the convertible top adapted to be moved between the closed position and the retracted position and the pair of frame members disposed, respectively, along right and left lateral edges of the convertible top and swingably pivoted relative to the vehicle body, as disclosed in the Patent Publication 1, a lower region in each of the right and left lateral edges of the convertible top which is essentially designed to be foldable is apt to be insufficient in rigidity. This is likely to cause a problem about difficulty in ensuring a sufficient sealing between the convertible top and the vehicle body in the closed position of the convertible top.

SUMMARY OF THE INVENTION

In view of the above problem, it is an object of the present invention to provide a vehicle convertible top assembly capable of ensuring a sufficient rigidity of a lower region in each of right and left lateral edges of a convertible top.

In order to achieve the above object, the present invention provides a convertible top assembly for a vehicle, which comprises a convertible top adapted to be moved between a closed position where the convertible top is closed to cover an upper portion of a passenger compartment and a retracted position where the convertible top is retracted in a storage space at a rear end of a vehicle body, a pair of frame members disposed, respectively, along right and left lateral edges of the convertible top and swingably pivoted relative to the vehicle body in such a manner as to be swung in a rearward inclined direction when the convertible top is retracted and to be swung in a standing direction when the convertible top is closed, a main link connected to each of the frame members in an interlocking manner and swingably pivoted relative to the vehicle body in such a manner as to be swung in the rearward inclined direction when the convertible top is retracted and to be swung in the standing direction when the convertible top is closed, a pair of reinforcing plate members each attached to an inner surface of a lower region in a corresponding one of the right and left lateral edges of the convertible top, and connection means for connecting between the main link and each of the reinforcing plate members.

In the convertible top assembly of the present invention, the reinforcing plate member reinforcing the lower region in each of the right and left lateral edges of the convertible top is connected to the main link through the connection means. Thus, the rigidity of the lower region in each of the right and left lateral edges of the convertible top can be increased. This makes it possible to ensure a sufficient sealing between the convertible top and the vehicle body in the closed position of the convertible top in a simplified structure. In addition, even if an external force is applied to the lower region in each of the right and left lateral edges of the convertible top, the reinforcing plate member providing an increased rigidity to the convertible top can effectively prevent a deformation of the convertible top.

DESCRIPTION OF THE PREFERRED EMBODIMENTS

With reference to the accompanying drawings, a preferred embodiment of the present invention of the present invention will now be described.

As shown in FIGS. 1 to 4, a convertible top assembly for a vehicle comprises a convertible top 3 adapted to be moved between a closed position where the convertible top 3 is closed to cover an upper portion of a passenger compartment 1 and a retracted position where the convertible top 3 is retracted in a storage space 10 at a rear end of a vehicle body 2, a pair of frame members 5 each of which is swingably pivoted relative to a corresponding one of a pair of right and left link-set brackets 27 fixed to the vehicle body 2 in such a manner as to be brought into contact with a rear portion of a corresponding one of right and left side windows 4 and brought into contact with a corresponding one of right and left lateral edges of the convertible top 3 when the convertible top 3 is closed, a first main link 6 connected to each of the frame members 5 in an interlocking manner and swingably pivoted relative to each of the link-set brackets 27 in such a manner as to be swung in a rearward inclined direction (in a direction inclined toward a rear end of the vehicle) when the convertible top 3 is retracted and to be swung in a standing direction when the convertible top 3 is closed, and a second main link 7 swingably pivoted relative to the first maim link 6 in such a manner as to be swung in the rearward inclined direction when the convertible top 3 is retracted and to be swung in the standing direction when the convertible top 3 is closed.

Figure 1:
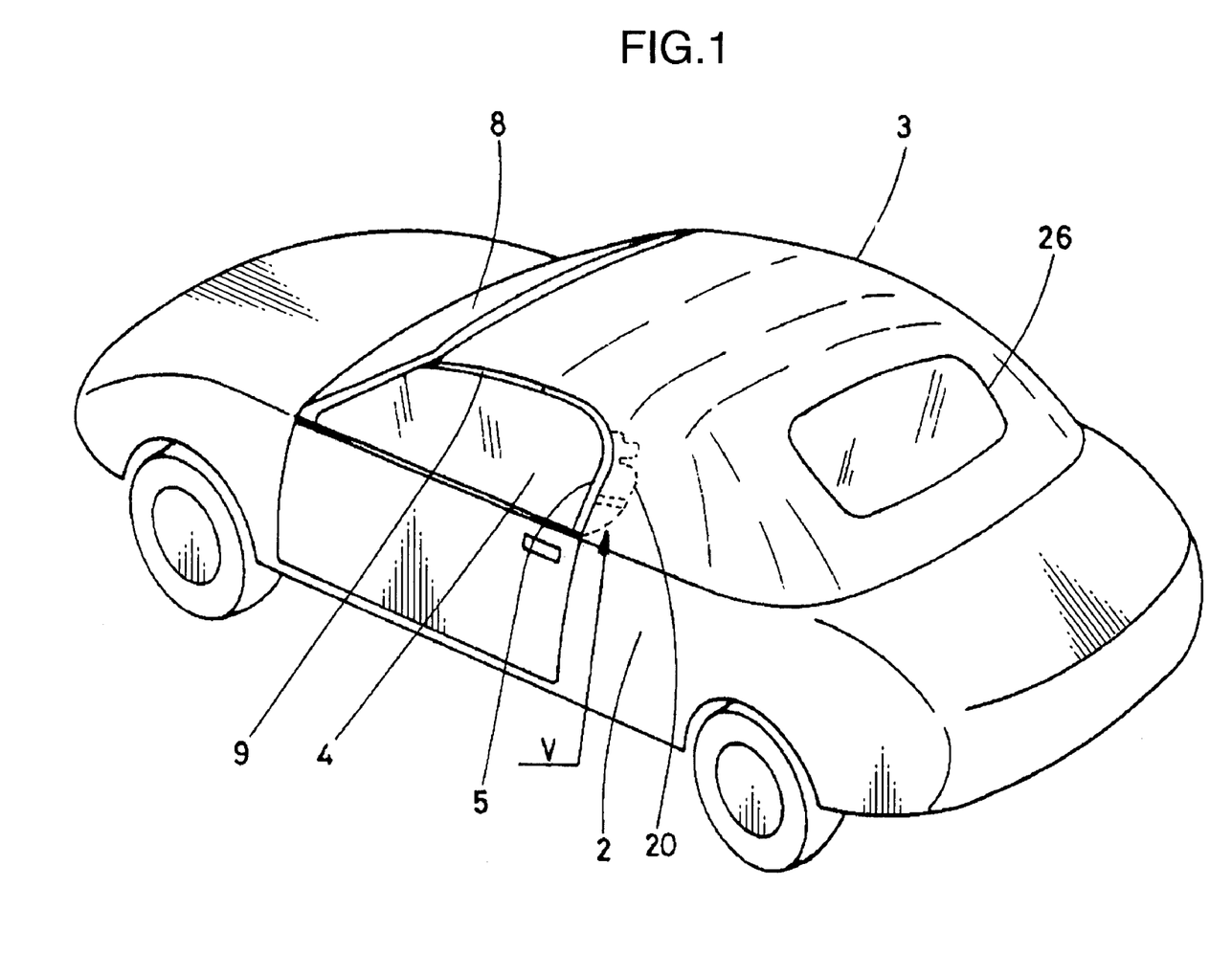
FIG. 1 is a perspective view showing a vehicle equipped with a convertible top assembly according to one embodiment of the present invention, wherein a convertible top is in a closed position.
Figure 2:
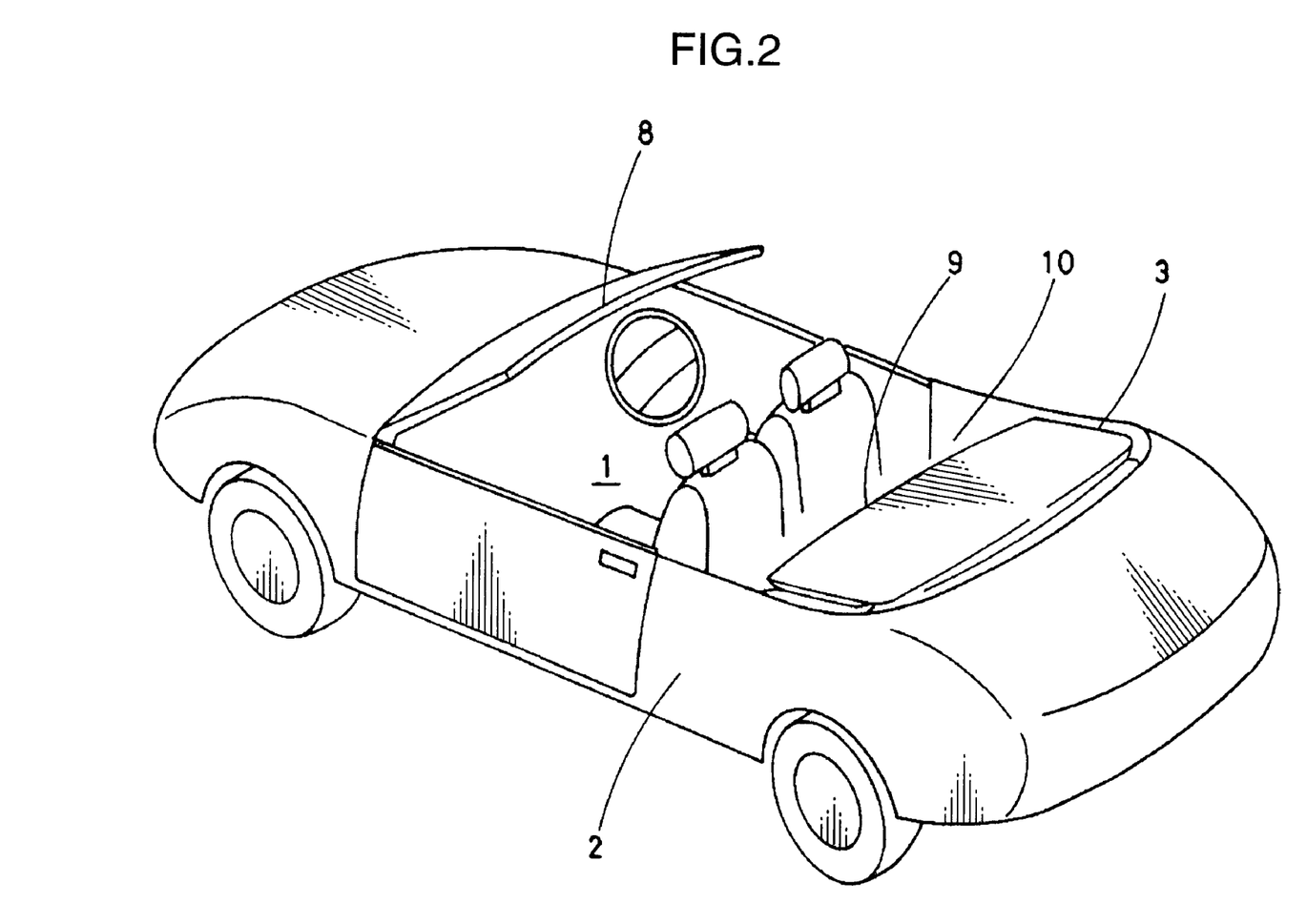
FIG. 2 is a perspective view showing the vehicle equipped with the convertible top assembly according to the embodiment, wherein the convertible top is in a retracted position.
Figure 3:
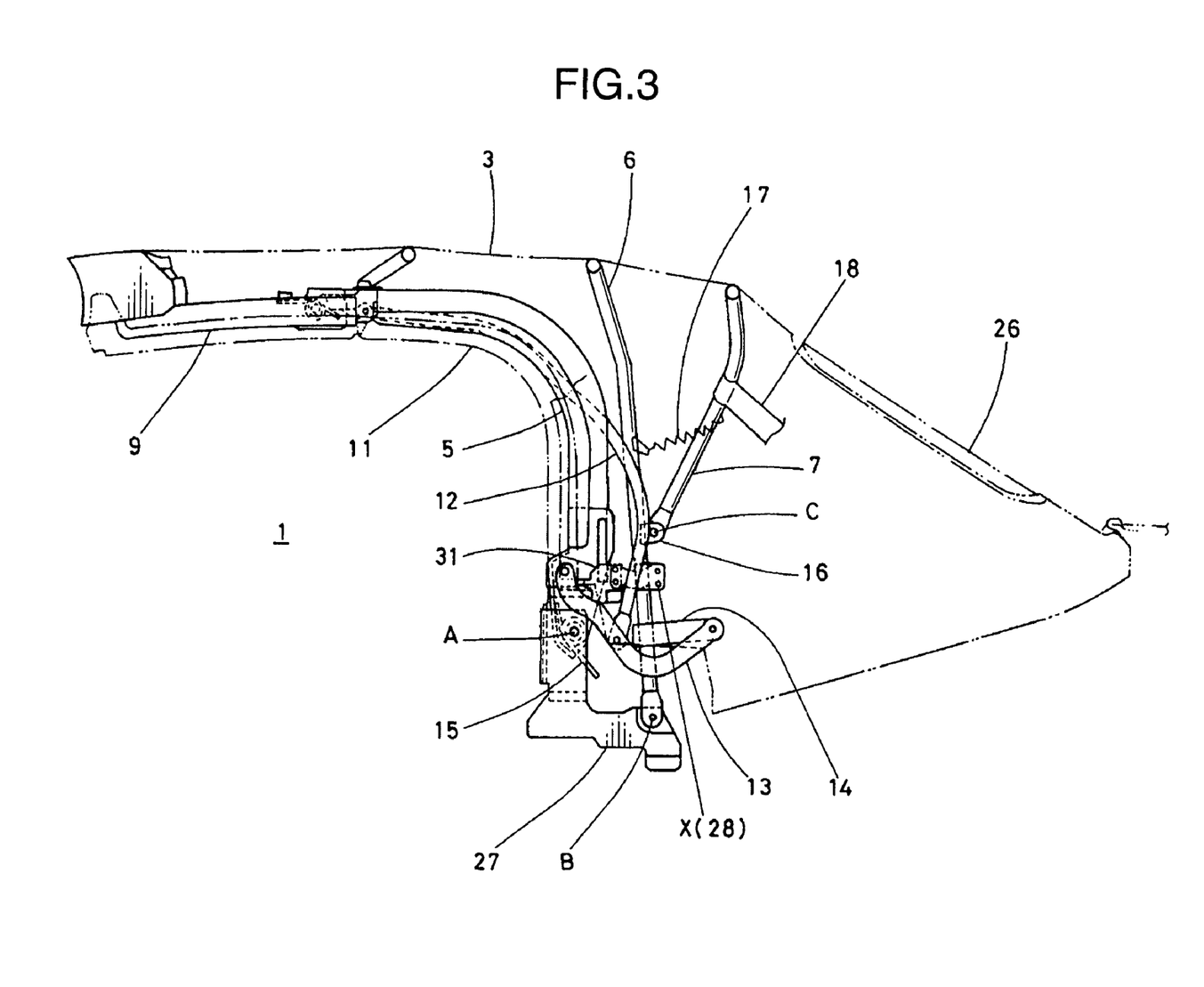
FIG. 3 is a fragmentary enlarged side view showing the convertible top assembly according to the embodiment, wherein the convertible top is in the closed position.
Figure 4:
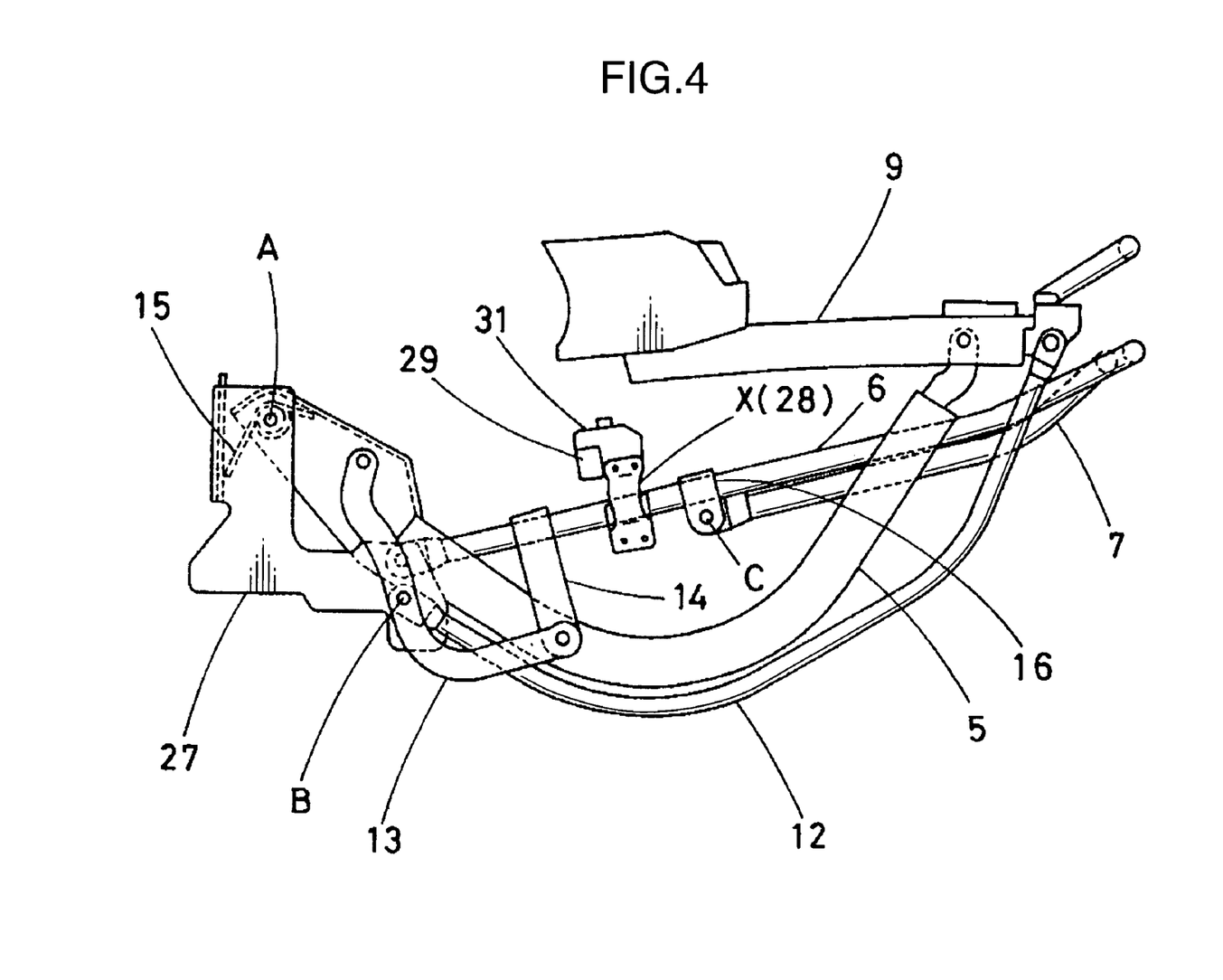
FIG. 4 is a fragmentary enlarged side view showing the convertible top assembly according to the embodiment, wherein the convertible top is in the retracted position.

In the closed position, the convertible top 3 extends from a rear or top edge of a front windshield 8 to a rear edge of the storage space 10 at the rear end of the vehicle body 2 so as to cover the upper portion of the passenger compartment 1. The convertible top 3 includes a hard portion 9 swingably pivoted relative to an front end of each of the frame members 5 and adapted to be brought into contact with the top edge of front windshield 8 in the closed position thereof. In FIG. 3, the reference numeral 11 indicates a weather strip, and the reference numeral 26 indicates a rear window.

The convertible top assembly further includes a pair of arm-shaped connection arms 13 each connecting between a corresponding one of the frame members 5 and the first main link 6 in an interlocking manner, and a pair of control links 12 each disposed along a corresponding one of the frame members 5. Each of the control links 12 has a rear end swingably pivoted relative to an intermediate portion of a corresponding one of the connection arms 13 and a front end swingably pivoted relative to a rear end of the hard portion 9. The control links 12 serve as a means to control a locus of the frame members 5 when the frame members 5 are swingably moved.

As above, the convertible top assembly has a laterally symmetric structure, and the following description will be made about one of the laterally opposite sides of the vehicle.

As seen in FIG. 3, a pivot point A of the frame member 5 to the link-set bracket 27 is designed to be located on the frontward and upper side of a pivot point B of the first main link 6 to the link-set bracket 27. The frame member 5 and the first main link 6 are connected to one another through the connection arm 13 in an interlocking manner. The connection arm 13 has a front end swingably pivoted on the frame member 5 at a position located on a slightly upper side of the pivot point A, and a rear end swingably pivoted on a rear end of a bracket 14 which has a front end fixed to the first main link 6 at a position located on a slightly upper side of the pivot point B and protrudes rearward.

The second main link 7 has a lower end swingably pivoted on a pivot point C of a bracket 16 fixed at an intermediate portion of the first main link 6. A spring 17 is fixed between the second main link 7 and the first main link 6 to apply a biasing force in a direction allowing the first and second main links 6, 7 to come closer to one another. In FIG. 3, the reference numeral 18 indicates a band for holding the second main link 7 at its standing position. The reference numeral 15 indicates a coil spring which serves as a means to bias the frame member 5 located at its rearward inclined position (see FIG. 4), in the standing direction.

Figure 5:
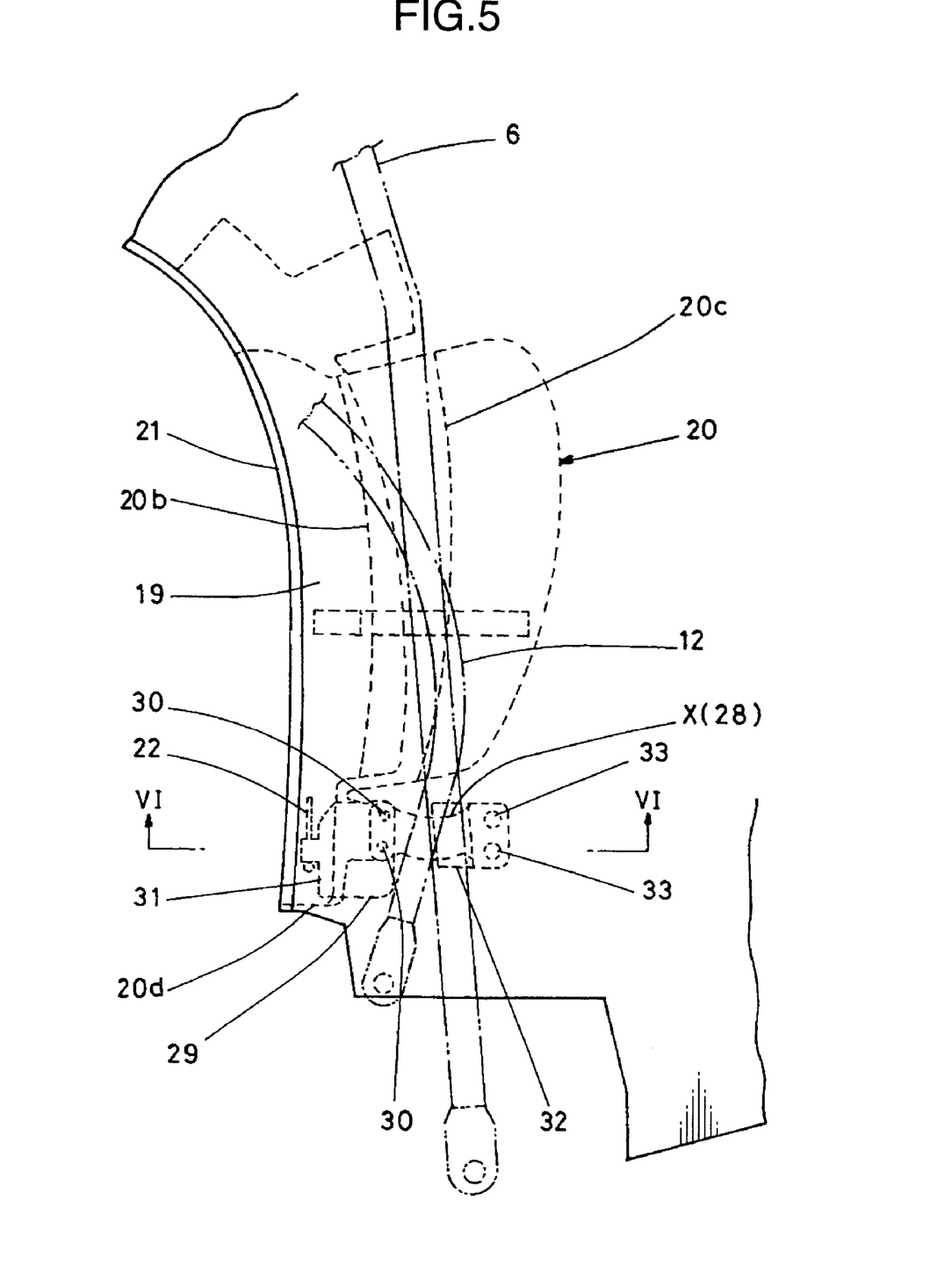
FIG. 5 is an enlarged view of the region V in FIG. 1.
Figure 6:
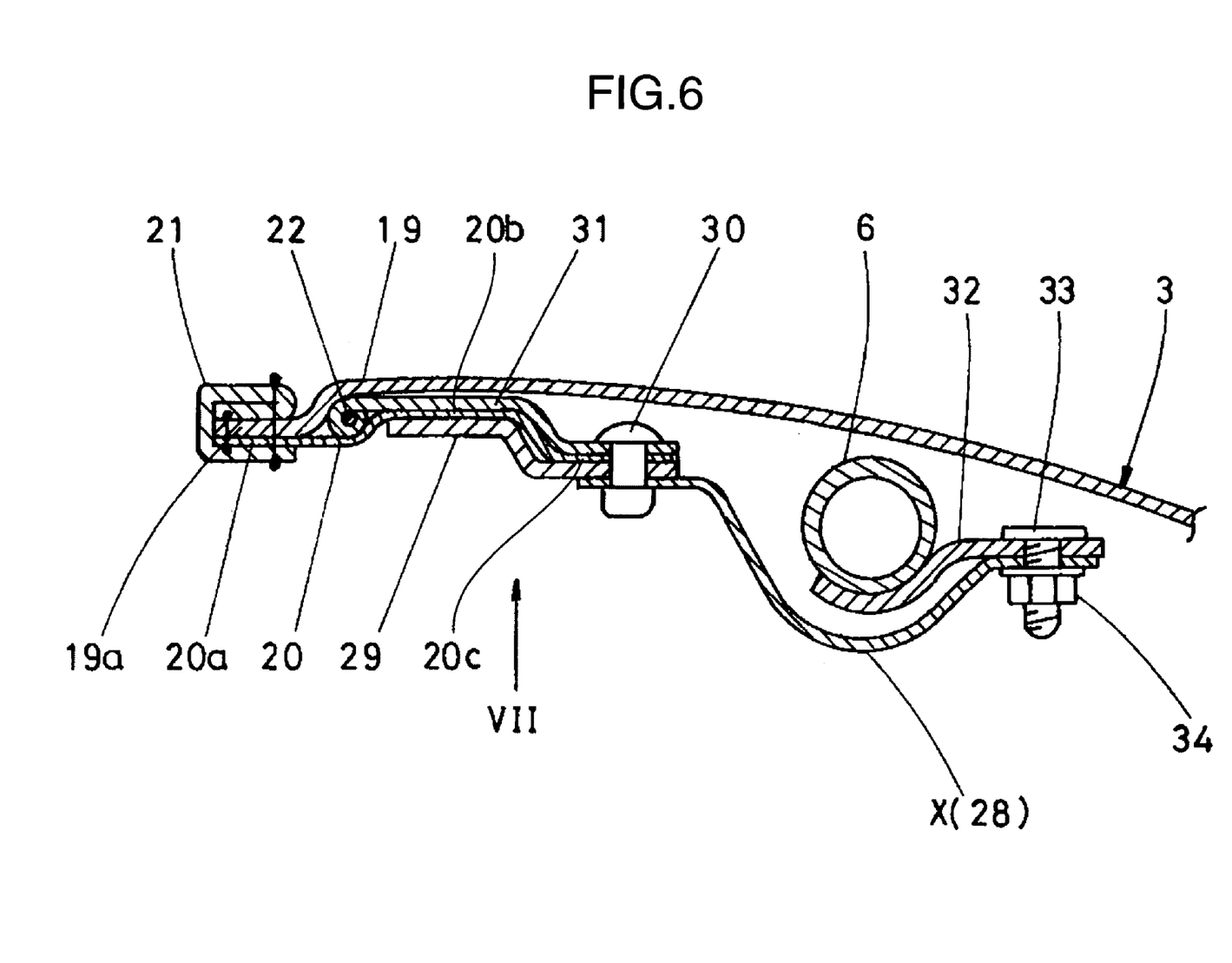
FIG. 6 is an enlarged sectional view taken along the line VI-VI in FIG. 5.
Figure 7:
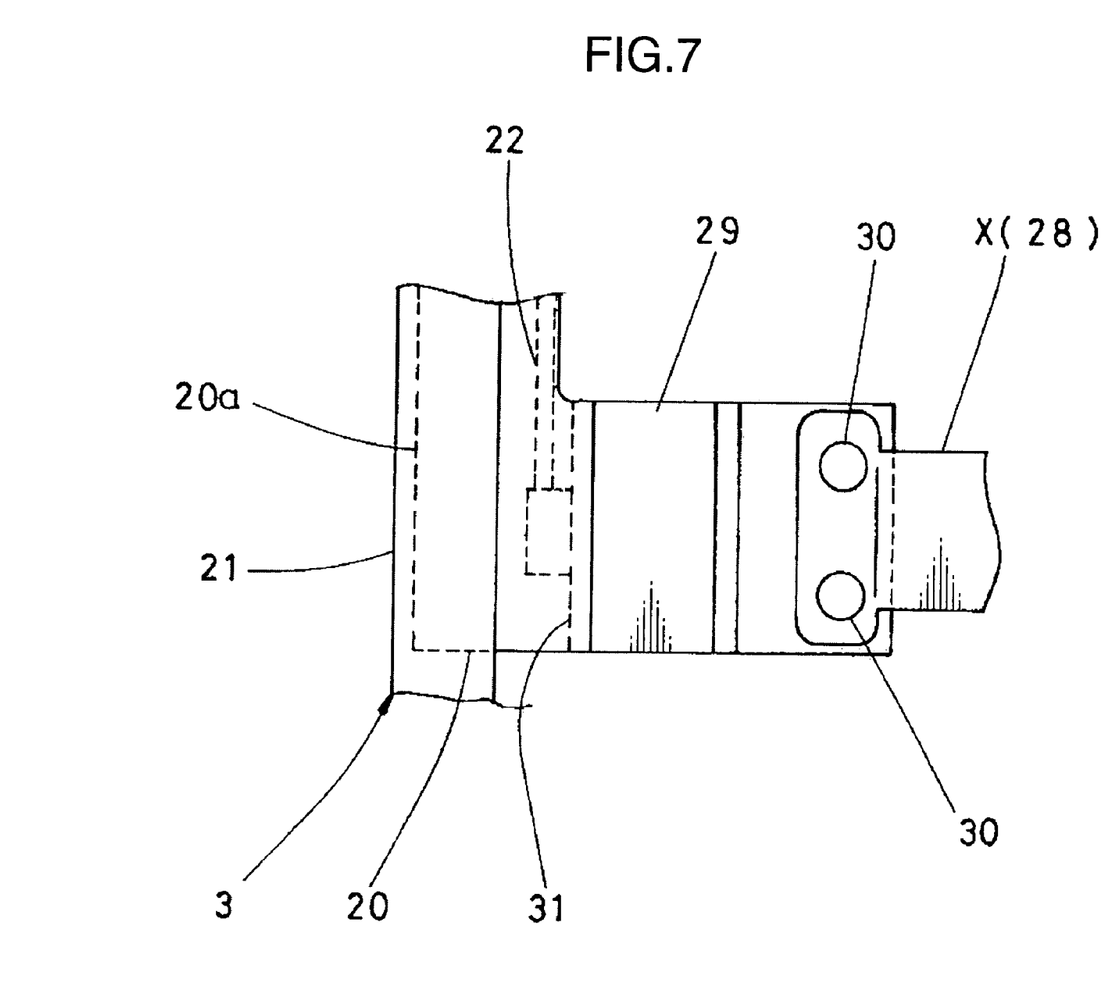
FIG. 7 is a fragmentary bottom view showing the region V, viewing in a direction indicated by the arrow VII in FIG. 6.

As shown in FIGS. 5 to 7, the convertible top assembly includes a pair of plate springs 28 each extending toward a corresponding one of the right and left lateral edges of the convertible top 3. Each of the plate springs 28 has a rear end attached to the first main link 6 through a bracket 32 fixed to the first main link 6. The first main link 6 and the bracket 32 are fastened to one another using a bolt 33 and a nut 34 threadingly engaged with the bolt 33. A protector 29 is fastened to a front end of the plate spring 28 using a fixing element (e.g. blind rivet) 30. The protector 29 is designed to be pressed against a slider (not shown) provided on an inner surface of the frame member 3, during a period from an intermediate stage to a final stage of a closing operation of the convertible top 3. The protector 29 is prepared by partially convexing a synthetic-resin plate member toward the frame member 5 (laterally outward). A wire end 31 is fastened to the front end of the plate spring 28 together with the protector 28. The wire end 31 is attached with an end of the wire 22 for moving the hard portion 9 during the closing/retracting operations of the convertible top 3.

In the above convertible top assembly, the convertible top 3 is not joined directly to the first main links 6. Thus, a lower region in each of the right and left lateral edges of the convertible top 3 which is located on the front and rear sides of the first main link 6 inevitably has lower rigidity to cause a problem about difficulty in adequately controlling a position of the lower region. As measures against this problem, it can be contemplated to extend the wire end 31 (made of metal) connected to the first main link 6, toward the lower region in each of the right and left lateral edges of the convertible top 3, and join the wire end 31 to the lower region of the lateral edge. In this case, a part of means for joining the lower region of the lateral edge of the convertible top 3 and the wire end 3 together (e.g. blind rivet) is exposed to an outer surface of the convertible top 3. This is likely to cause deterioration in appearance. In order to avoid this disadvantage, it can also be contemplated to fold back the lower region of the lateral edge of the convertible top 3 inward and join the wire end 31 to the folded portion. However, this structure involves a new problem about difficulty in ensuring a sufficient space for folding back the lower region of the lateral edge of the convertible top 3 inward, because the frame member 5 in this embodiment is designed to be relatively moved along an inner surface of the convertible top 3 during the closing/retracting operations of the convertible top 3.

Thus, as shown in FIGS. 5 to 7, the convertible top assembly according to this embodiment includes a pair of reinforcing plate members 20 each having a size capable of covering an inner surface of a lower region 19a in each of the right and left lateral edges 19 of the convertible top 3. Further, a front edge 20a of the reinforcing plate member 20 and the lower region 19a in each of the right and left lateral edges 19 of the convertible top 3 are superimposed on one another and sewn together while being covered by a binding fabric 21 having an approximately U shape in section. The wire 22 for moving the hard portion 9 during the closing/retracting operations of the convertible top 3 is sewn on the lower region 19a in each of right and left lateral edges 19 of the convertible top 3.

The reinforcing plate member 20 is prepared by cutting a thin resin plate into approximately elongated rectangular shape and forming a convex portion in an intermediate position along a direction of a short edge thereof (along a direction orthogonal to a longitudinal direction of the binding fabric 21). Specifically, the reinforcing plate member 20 has the front edge 20a sewn together with the binding fabric 21, a rear edge 20c fastened to the front end of the plate spring 28 located rearward relative to the front edge 20a, and the convex portion 20b protruding laterally outward in the intermediate position located between the rear edge 20c and the front edge 20a.

That is, the reinforcing plate member 20 has a lower portion connected to the first main link 6 through the plate spring 28. In other words, the plate spring 28 serves as connection means X for connecting the reinforcing plate member 20 to the first main link 6. In this embodiment, the rear edge 20c of the reinforcing plate member 20 is fastened to the front end of the plate spring 28 using the fixing element (e.g. blind rivet) 30 together with the protector 29 and the wire end 31.

In the convertible top assembly according to this embodiment, the following advantages can be obtained.

The reinforcing plate member 20 reinforcing the lower region in each of the right and left lateral edges of the convertible top 3 is connected to the first main link 6 through the connection means X consisting of the plate spring 28. Thus, the rigidity of the lower region in each of the right and left lateral edges of the convertible top 3 is increased. This makes it possible to ensure a sufficient sealing between the convertible top 3 and the vehicle body 2 in the closed position of the convertible top 3 in a simplified structure. In addition, even if an external force is applied to the lower region in each of the right and left lateral edges of the convertible top 3, the reinforcing plate member 20 providing an increased rigidity to the convertible top 3 can effectively prevent a deformation of the convertible top 3. Further, the plate spring 28 is employed as the connection means X for connecting between the reinforcing plate member 20 and the first main link 6. Thus, even if the lower region in each of the right and left lateral edges of the convertible top 3 is deformed during the closing/retracting operations of the convertible top 3, the convertible top 3 can be readily returned to its original shape by the biasing force (or a restoring force) of the plate spring 28.

It is understood that the present invention is not limited to the above embodiment, but various modifications and changes may be made therein without departing from the spirit and scope of the invention.

As mentioned above, the convertible top assembly of the present invention comprises a convertible top 3 adapted to be moved between a closed position where the convertible top 3 is closed to cover an upper portion of a passenger compartment 1 and a retracted position where the convertible top 3 is retracted in a storage space 10 at a rear end of a vehicle body 2, a pair of frame members 5 disposed, respectively, along right and left lateral edges of the convertible top 3 and swingably pivoted relative to the vehicle body 2 in such a manner as to be swung in a rearward inclined direction when the convertible top 3 is retracted and to be swung in a standing direction when the convertible top 3 is closed, a main link 6 connected to each of the frame members 5 in an interlocking manner and swingably pivoted relative to the vehicle body 2 in such a manner as to be swung in the rearward inclined direction when the convertible top 3 is retracted and to be swung in the standing direction when the convertible top 3 is closed, a pair of reinforcing plate members 20 each attached to an inner surface of a lower region in a corresponding one of the right and left lateral edges of the convertible top 3, and connection means X for connecting between the main link 6 and each of the reinforcing plate members 20.

In the convertible top assembly of the present invention, the reinforcing plate member 20 reinforcing the lower region in each of the right and left lateral edges of the convertible top 3 is connected to the main link 6 through the connection means X. Thus, the rigidity of the lower region in each of the right and left lateral edges of the convertible top 3 can be increased. This makes it possible to ensure a sufficient sealing between the convertible top 3 and the vehicle body 2 in the closed position of the convertible top 3 in a simplified structure. In addition, even if an external force is applied to the lower region in each of the right and left lateral edges of the convertible top 3, the reinforcing plate member 20 providing an increased rigidity to the convertible top 3 can effectively prevent a deformation of the convertible top 3.

In the convertible top assembly of the present invention, the connection means X may comprises a plate spring 28 connecting between the main link 6 and a rear edge 20c of the reinforcing plate member 20.

In this case, even if the lower region in each of the right and left lateral edges of the convertible top 3 is deformed during the closing/retracting operations of the convertible top 3, the convertible top 3 can be readily returned to its original shape by the biasing force (or a restoring force) of the plate spring 28.

This application claims priority from Japanese Patent Application No. 2005-050534, filed in Japan Patent Office on Feb. 25, 2005. The contents of the Japanese Patent Application, hereby, constitute part of the present application by incorporation by reference.

Although the present invention has been described by way of specific embodiments, it will be appreciated that various changes and modifications may be made by those skilled in the art without departing the spirit and the scope of the invention as set forth in the following claims.

What is claimed is:

1. A convertible top assembly for a vehicle, comprising:
    a convertible top adapted to be moved between a closed position where the convertible top is closed to cover an upper portion of a passenger compartment and a retracted position where the convertible top is retracted in a storage space at a rear end of a vehicle body;
    a pair of frame members disposed, respectively, along right and left lateral edges of said convertible top and swingably pivoted relative to the vehicle body in such a manner as to be swung in a rearward inclined direction when said convertible top is retracted and to be swung in a standing direction when said convertible top is closed;
    a main link connected to each of said frame members in an interlocking manner and swingably pivoted relative to the vehicle body in such a manner as to be swung in the rearward inclined direction when said convertible top is retracted and to be swung in the standing direction when said convertible top is closed;
    a pair of reinforcing plate members each attached to an inner surface of a lower region in a corresponding one of said right and left lateral edges of said convertible top; and
    connection means for connecting between said main link and each of said reinforcing plate members.

2. The convertible top assembly as defined in claim 1, wherein said connection means comprises a plate spring connecting between said main link and a rear edge of said reinforcing plate member.

* * * * *

UNITED STATES PATENT AND TRADEMARK OFFICE
CERTIFICATE OF CORRECTION

PATENT NO. : 7,258,388 B2
APPLICATION NO. : 11/354889
DATED : August 21, 2007
INVENTOR(S) : Hiroaki Mori and Hiroki Tanoue It is certified that error appears in the above-identified patent and that said Letters Patent is hereby corrected as shown below:

On the Title Page, Item (73) Assignee should read: MAZDA MOTOR CORPORATION, Hiroshima (JP); TOYO SEAT CO., LTD., Osaka (JP)

Signed and Sealed this

Fourteenth Day of December, 2010

David J. Kappos
*Director of the United States Patent and Trademark Office*